United States Patent
Malischewski et al.

(10) Patent No.: US 10,634,014 B2
(45) Date of Patent: Apr. 28, 2020

(54) VARIABLE VALVE DRIVE WITH A SLIDING CAM SYSTEM FOR AN INTERNAL COMBUSTION ENGINE

(71) Applicant: MAN Truck & Bus AG, München (DE)

(72) Inventors: Thomas Malischewski, Heilsbronn (DE); Steffen Hirschmann, Neustadt an der Aisch (DE); Dominic Hyna, Fürth (DE)

(73) Assignee: MAN TRUCK & BUS AG, München (DE)

( * ) Notice: Subject to any disclaimer, the term of this patent is extended or adjusted under 35 U.S.C. 154(b) by 0 days.

(21) Appl. No.: 16/290,014

(22) Filed: Mar. 1, 2019

(65) Prior Publication Data
US 2019/0277166 A1  Sep. 12, 2019

(30) Foreign Application Priority Data
Mar. 8, 2018  (DE) .......... 10 2018 105 359

(51) Int. Cl.
| | | |
|---|---|---|
| F01L 1/047 | (2006.01) | |
| F02D 13/04 | (2006.01) | |
| F16H 53/02 | (2006.01) | |
| F01L 13/06 | (2006.01) | |
| F01L 13/00 | (2006.01) | |
| F01L 1/18 | (2006.01) | |
| F01L 1/46 | (2006.01) | |
| F02D 13/02 | (2006.01) | |

(52) U.S. Cl.
CPC ............. F01L 1/047 (2013.01); F01L 13/06 (2013.01); F02D 13/04 (2013.01); F16H 53/025 (2013.01);
(Continued)

(58) Field of Classification Search
CPC ....... F01L 2001/0473; F01L 2001/0537; F01L 1/143; F01L 1/18; F01L 2001/186;
(Continued)

(56) References Cited

U.S. PATENT DOCUMENTS

| | | | |
|---|---|---|---|
| 6,276,320 B1 * | 8/2001 | Fujii | F01L 1/0532 123/90.16 |
| 2010/0063706 A1 * | 3/2010 | Surnilla | F02D 13/0211 701/102 |

(Continued)

FOREIGN PATENT DOCUMENTS

| | | |
|---|---|---|
| DE | 102006011981 A1 | 9/2007 |
| DE | 102009015639 A1 | 9/2010 |

(Continued)

*Primary Examiner* — Jorge L Leon, Jr.
(74) *Attorney, Agent, or Firm* — Weber Rosselli & Cannon LLP

(57) ABSTRACT

A variable drive for an internal combustion engine with a first gas exchange valve, in particular outlet valve, and a second gas exchange valve, in particular outlet valve. The variable valve drive has a sliding cam system. The sliding cam system has an axially displaceable cam carrier which, for the first gas exchange valve, has only two cams, namely a first cam and a second cam offset axially with respect thereto, and, for the second gas exchange valve, has only two cams, namely a third cam and a fourth cam offset axially with respect thereto. The first cam, the second cam, the third cam and the fourth cam differ from a zero lift cam. The first cam and the third cam are identical in design. The second cam and the fourth cam differ in design.

17 Claims, 4 Drawing Sheets

(52) U.S. Cl.
CPC .............. *F01L 1/181* (2013.01); *F01L 1/185* (2013.01); *F01L 2001/0473* (2013.01); *F01L 2001/186* (2013.01); *F01L 2001/467* (2013.01); *F01L 2013/0052* (2013.01); *F01L 2820/02* (2013.01); *F02D 13/0246* (2013.01)

(58) Field of Classification Search
CPC .................. F01L 1/267; F01L 13/0005; F01L 2013/0052; F01L 2013/0089; F01L 13/06; F01L 13/08; F01L 2800/06; F02D 13/0242; F02D 13/0246; F02D 13/0249; F02D 13/0257; F02D 13/0276; F02D 13/04
USPC .......... 123/90.16, 90.18, 90.27, 90.39, 90.48
See application file for complete search history.

(56) References Cited

U.S. PATENT DOCUMENTS

| | | | | |
|---|---|---|---|---|
| 2011/0219767 | A1* | 9/2011 | Miyashita | F01L 1/185 60/600 |
| 2012/0222639 | A1* | 9/2012 | Knauf | F01L 13/0021 123/90.44 |
| 2013/0145832 | A1* | 6/2013 | Fedewa | F01L 1/267 73/114.79 |
| 2014/0000557 | A1* | 1/2014 | Glugla | F02D 41/008 123/435 |
| 2014/0137819 | A1* | 5/2014 | McConville | F01L 13/0036 123/90.6 |
| 2014/0165940 | A1 | 6/2014 | Woo et al. | |
| 2017/0321575 | A1 | 11/2017 | Wetzel et al. | |
| 2018/0142585 | A1* | 5/2018 | Lahr | F01L 13/065 |
| 2019/0178116 | A1* | 6/2019 | Schott | F01L 1/053 |

FOREIGN PATENT DOCUMENTS

| | | |
|---|---|---|
| DE | 102011052912 A1 | 2/2013 |
| DE | 102013019183 A1 | 5/2015 |
| DE | 102015106978 A1 | 6/2016 |
| DE | 102015008722 A1 | 1/2017 |
| WO | 2012038191 A1 | 3/2012 |
| WO | 2012038195 A1 | 3/2012 |
| WO | 2014191385 A1 | 12/2014 |
| WO | 2017174353 A1 | 10/2017 |

* cited by examiner

VARIABLE VALVE DRIVE WITH A SLIDING CAM SYSTEM FOR AN INTERNAL COMBUSTION ENGINE

BACKGROUND

The disclosure relates to a variable valve drive with a sliding cam system for an internal combustion engine.

Sliding cam systems are known in which, depending on an axial position of a cam carrier, different cams of the cam carrier can be brought into operative connection with a gas exchange valve.

DE 10 2015 008722 A1 discloses an engine-internal heating mode by means of an increase in load, which heating mode can be adjusted by means of a cam contour device by switching over to a different cam.

A sliding cam system is known, for example, from DE 10 2011 052912 A1. The sliding cam system has a sliding cam or cam carrier which in each case has three cam tracks or cam contours for two inlet valves.

A disadvantage of the known prior art can be the fact that a separate cam or a separate cam track is provided on the cam carrier for every desired engine mode. Switching over between more than two cam contours for a valve can be complicated to realize structurally and to control.

SUMMARY

According to more general aspects, the disclosure is based on the object of providing an alternative and/or improved variable valve drive with which disadvantages in the prior art can be overcome. In particular, an extended functionality of the variable valve drive is intended to be made possible without increasing a number of cams of a cam carrier of a sliding cam system.

According to a more specific aspect, the disclosure is based on the object of providing an alternative and/or improved variable valve drive which manages in particular without increasing a number of cams from two cams per valve and nevertheless provides more than two operating modes. In particular, the intention is to be able to realize a normal operating mode, an engine braking mode and/or an exhaust gas temperature increasing operating mode.

The variable valve drive is suitable for an internal combustion engine with a first gas exchange valve, in particular outlet valve, and a second gas exchange valve (e.g. of the same type (inlet or outlet valve) as the first gas exchange valve), in particular outlet valve. The variable valve drive comprises a sliding cam system. The sliding cam system has an axially displaceable cam carrier (for example arranged in an axially displaceable manner on a shaft and/or on the shaft for rotation therewith). For the first gas exchange valve, the cam carrier has a first cam and a second cam offset axially with respect thereto (for example directly axially adjacent). For the second gas exchange valve, the cam carrier has a third cam and a fourth cam offset axially with respect thereto (for example directly axially adjacent). Depending on an axial position of the cam carrier, either the first cam is positioned for actuating the first gas exchange valve and (in particular simultaneously) the third cam is positioned for actuating the second gas exchange valve or the second cam is positioned for actuating the first gas exchange valve and (in particular simultaneously) the fourth cam is positioned for actuating the second gas exchange valve. Put in other words, if the first cam actuates the first gas exchange valve, then the third cam also actuates the second gas exchange valve, and, if the second cam actuates the first gas exchange valve, then the fourth cam also actuates the second gas exchange valve. The first cam, the second cam, the third cam and the fourth cam can differ from an (imaginary) zero lift cam (for example, they have a cam contour with at least one elevation and/or depression). The first cam and the third cam are (substantially) identical in design. The second cam and the fourth cam differ in design.

According to the more general aspects, the variable valve drive makes it possible for the first cam and the third cam to be able to be used for a first operating mode, for example a normal operating mode. By contrast, the second cam and the fourth cam differ in design, and therefore different functions with different gas exchange valves, in particular of the same type (inlet valve or outlet valve), can be realized with said two cams. The different functions can, for example, interact with one another in an advantageous manner or can be entirely separate functions.

According to the specific aspect, the variable valve drive makes it possible for the second cam and the fourth cam when combined together to permit an engine braking mode, with, for example, different portions of the engine braking mode being distributed to the second cam and to the fourth cam. This has the result that the first gas exchange valve realizes a first portion of the engine braking mode while the second gas exchange valve realizes a second portion of the engine braking mode.

A cylinder assigned to the first and second gas exchange valve is expediently not fired in the engine braking mode.

In a preferred exemplary embodiment, the variable valve drive furthermore has separate force transmission devices (e.g. tappets, follower levers, rocker levers) for operative connection of the first cam and of the second cam to the first gas exchange valve and for operative connection of the third cam and of the fourth cam to the second gas exchange valve. The first gas exchange valve and the second gas exchange valve can therefore be actuated separately from each other via the force transmission devices.

For example, the variable valve drive can have a first force transmission device (e.g. tappet, follower lever, rocker lever), by means of which the first gas exchange valve can be operatively connected to the first cam or to the second cam depending on an axial position of the cam carrier. Alternatively or additionally, the variable valve drive can have a second force transmission device (e.g. tappet, follower lever, rocker lever), by means of which the second gas exchange valve can be operatively connected to the third cam or to the fourth cam depending on an axial position of the cam carrier. The first and second force transmission device can be provided separately from each other and/or may not be operatively connected to each other.

In one exemplary embodiment, a first force transmission device and/or a second force transmission device have/has a changing device, which in particular can be switched on, for changing a transmission of a cam contour of the respectively operatively connected cam. There is therefore the possibility, for example, of increasing, of reducing and/or of displacing a stroke a valve control curve.

In a further embodiment, a first force transmission device and/or a second force transmission device have/has an lost motion device, which in particular can be switched on, for at least partially compensating, in particular completely compensating, for a transmission of a cam contour of the respectively operatively connected cam.

In particular (for example only) the first force transmission device can have a lost motion device. The lost motion device can be designed to compensate, in particular completely, for a cam contour of the second cam.

The lost motion device can expediently be arranged on a valve side or a cam shaft side of the force transmission device.

For example, the lost motion device can have a displaceable actuating piston, the displaceability of which can be blocked, for example hydraulically, for example by at least one displaceable blocking piston, in order to realize the lost motion functionality.

It is possible for the first force transmission device, the second force transmission device, the changing device and/or the lost motion device to be able to have a hydraulic valve play compensating element 54.

In a further exemplary embodiment, the first cam and the third cam are designed as normal outlet valve cams. Alternatively or additionally, the first cam and the third cam are designed for keeping the first gas exchange valve and the second gas exchange valve open during an outlet stroke. For example, the first cam and the third cam can keep the first gas exchange valve and the second gas exchange valve closed during the remaining control cycle.

In one embodiment, the second cam is designed for keeping the first gas exchange valve closed and subsequently opening same in the compression stroke in order to being about gas decompression. That is to say, the first gas exchange valve is initially kept closed in the compression stroke and is subsequently also opened in the compression stroke. Alternatively or additionally, the second cam is designed for at least temporarily keeping the first gas exchange valve open in the expansion stroke in order to intake gas. In particular a first portion of an engine braking mode can therefore be realized at the first gas exchange valve by means of the second cam, with gas decompression in the compression stroke and subsequent gas intake in the expansion stroke.

In a further embodiment, the fourth cam is designed for keeping the second gas exchange valve closed and subsequently opening same in the outlet stroke in order to bring about gas decompression. That is to say, the second gas exchange valve is initially kept closed in the outlet stroke and is subsequently also opened in the outlet stroke. A second portion of an engine braking mode can therefore be realized at the second gas exchange valve by means of the fourth cam, with gas decompression in the compression stroke. In addition, an exhaust gas temperature increasing mode can be realized at the second gas exchange valve by means of the fourth cam if the cylinder is fired and a cam contour of the second cam is compensated for in any way, for example by means of a lost motion device. The temperature increase arises in particular on account of the fact that the work of the charge exchange loop in the p-V diagram is significantly increased.

A cylinder assigned to the first gas exchange valve and to the second gas exchange valve is expediently fired in the exhaust gas temperature increasing mode.

In another embodiment, the second cam and the fourth cam when combined together bring about an engine braking mode, in particular with a first gas decompression in the compression stroke, gas intake in the expansion stroke and/or a second gas decompression in the outlet stroke.

In a further embodiment, the fourth cam and an activated lost motion device for, in particular completely, compensating for a cam contour of the second cam bring about an exhaust gas temperature increasing mode, in particular with gas decompression in the outlet stroke.

In a variant embodiment, the fourth cam is designed for opening the second gas exchange valve (in particular once per control cycle), specifically in the outlet stroke after a first half of the outlet stroke; in the range of between 120° crank angle before TDC (top dead centre of a piston movement of a piston of the cylinder) and 40° crank angle before TDC; and/or in the range of between 100° crank angle before TDC and 60° before TDC; and/or in the range of between 90° crank angle before TDC and 70° before TDC; and/or at (approximately) 80° crank angle before TDC.

In a further variant embodiment, the fourth cam is designed for keeping the second gas exchange valve open (in particular once per control cycle) for less than 160° crank angle, 150° crank angle, 140° crank angle and/or 130° crank angle; and/or for more than 80° crank angle, 90° crank angle, 100° crank angle and/or 110° crank angle; and/or for (approximately) 120° crank angle.

In a further exemplary embodiment, a (maximum) valve stroke brought about by the fourth cam is less than 50%, 40%, 30% and/or 25%; and/or greater than 5%, 10%, 15% of a (maximum) valve stroke which is brought about by the third cam. Alternatively or additionally, the (maximum) valve stroke brought about by the fourth cam is less than 5 mm, 4 mm, 3 mm and/or 2.5 mm; and/or greater than 0.5 mm, 1 mm, 1.5 mm; and/or (approximately) 2 mm.

In one embodiment, a closing time of the outlet valve is (substantially) unchanged compared with a normal closing time of the outlet valve (for example closing time in the normal mode, lying, for example, at the end of the outlet stroke or at the beginning of the inlet stroke), in particular according to the first cam and the third cam. Alternatively or additionally, the closing time of the outlet valve lies in the range of the TDC (in the outlet stroke), in particular between TDC and 40° after TDC (in the inlet stroke).

In yet a further embodiment, the operation of the internal combustion engine in the exhaust gas temperature increasing mode takes place in a weak load range, in particular below an engine rotational speed of (approximately) 1200 rpm and/or within an engine rotational speed range of between (approximately) 600 rpm and (approximately) 1000 rpm. In particular under such weak load conditions, it has previously been difficult to reach a high exhaust gas temperature, for example for regenerating a particle filter.

In a variant embodiment, the exhaust gas temperature increasing mode is carried out if it is detected, in particular directly (for example by measuring) or indirectly (for example indirectly by sensing parameter values, switching states, conditions or operating states of the internal combustion engine) that a current exhaust gas temperature is lower than a desired exhaust gas temperature (e.g. 300° C. for regenerating a particle filter or 150° C. for operating an SCR catalytic converter). Alternatively or additionally, it is sensed that a current exhaust gas temperature is lower then a minimum exhaust gas temperature for operating an exhaust gas aftertreatment system, in particular an SCR catalytic converter, of the internal combustion engine and/or regeneration of a particle filter, in particular a diesel particle filter is desired (e.g. expiry of a predetermined time or engine running time since the last regeneration, measurement of a number of particles or the like). It is also possible for it to be sensed that the internal combustion engine is started, in particular under cold start conditions. The exhaust gas temperature increasing mode can therefore be carried out in particular if an increase in the exhaust gas temperature is actually desired or required.

In a further variant embodiment, the exhaust gas temperature increasing mode is carried out until it is sensed, in particular directly (for example by measuring) or indirectly (for example indirectly by sensing parameter values, switching states, conditions or operating states of the internal combustion engine) that a current exhaust gas temperature is greater than or equal to a desired exhaust gas temperature. It is also possible, for example, for it to be sensed that a current exhaust gas temperature is identical to or greater than a minimum exhaust gas temperature for operating an exhaust gas aftertreatment system, in particular an SCR catalytic converter, of the internal combustion engine and/or a regeneration of a particle filter, in particular of a diesel particle filter, is finished. The exhaust gas temperature increasing mode can therefore be ended when the increased exhaust gas temperature is no longer required or the exhaust gas temperature has been increased to a sufficiently high level.

In one exemplary embodiment, the second cam is designed for opening the first gas exchange valve (in particular once per control cycle), specifically in the compression stroke after a first half of the compression stroke; and/or in the range of between 120° crank angle before TDC and 40° crank angle before TDC; and/or in the range of between 100° crank angle before TDC and 60° before TDC; and/or in the range of between 90° crank angle before TDC and 70° before TDC; and/or at (approximately) 80° angle shaft before TDC.

In a further exemplary embodiment, the second cam is designed for keeping the first gas exchange valve open (in particular once per control cycle) for less than 400° crank angle, 350° crank angle, 330° crank angle and/or 310° crank angle; and/or for more than 200° crank angle, 250° crank angle, 270° crank angle and/or 290° crank angle; and/or for (approximately) 300° crank angle.

The disclosure is also directed towards a motor vehicle, in particular a utility vehicle (for example bus or lorry), with a variable valve drive as disclosed herein.

It is also possible to use the device as disclosed herein for passenger vehicles, large engines, all-terrain vehicles, stationary engines, marine engines, etc.

BRIEF DESCRIPTION OF THE DRAWINGS

The previously described embodiments and features of the disclosure can be combined with one another as desired. Further details and advantages of the disclosure will be described below with reference to the attached drawings, in which.

The embodiments shown in the figures at least partially correspond, and therefore similar or identical parts are provided with the same reference signs and, for the explanation thereof, reference is also made to the description of the other embodiments or figures in order to avoid repetition.

DETAILED DESCRIPTION

Figure 1:
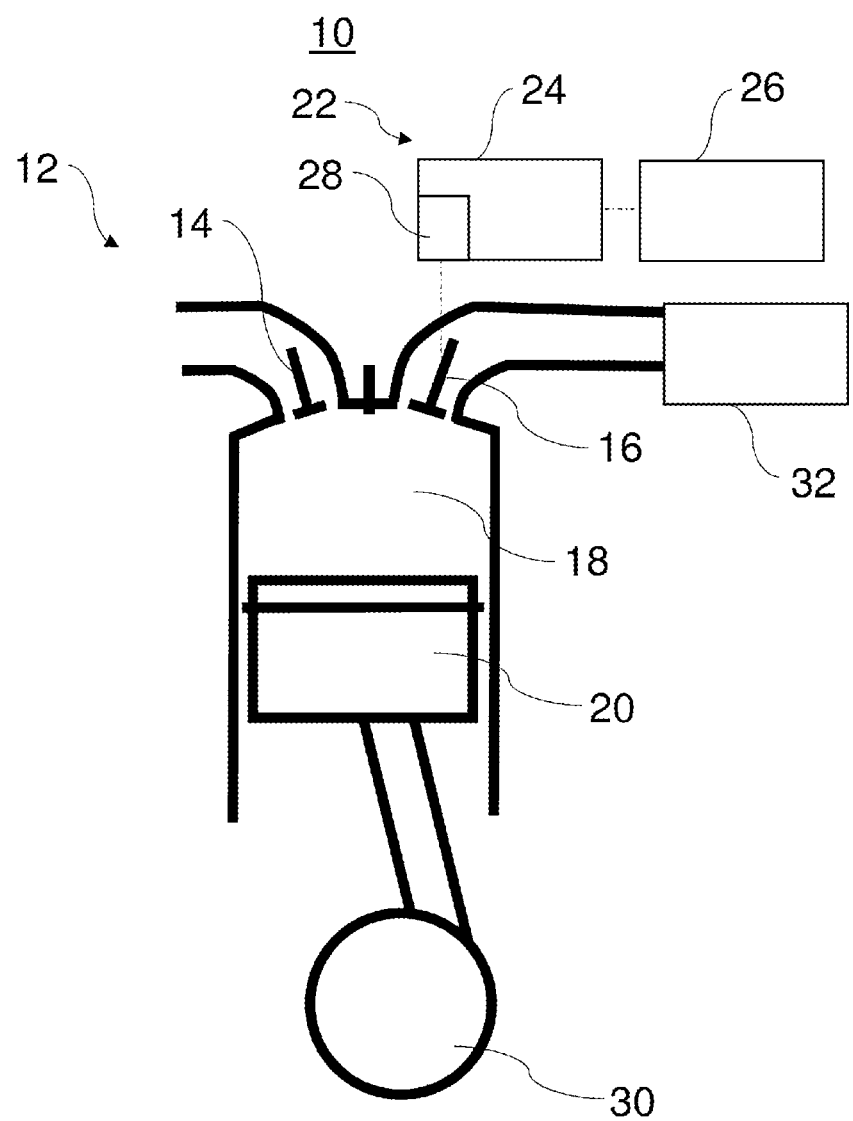
FIG. 1 shows a schematic illustration of a cylinder of an internal combustion engine.

FIG. 1 shows a cylinder 12 of an internal combustion engine 10. The internal combustion engine 10 is a four-stroke internal combustion engine, in particular a four-stroke diesel internal combustion engine or a four-stroke petrol internal combustion engine. The internal combustion engine 10 is comprised preferably in a utility vehicle, for example a lorry or a bus, for driving the utility vehicle.

The exemplary cylinder 12 has two inlet valves 14 (only one illustrated in FIG. 1) and two outlet valves 16 (only one illustrated in FIG. 1). The cylinder 12 furthermore has a combustion chamber 18 and a piston 20. The internal combustion engine 10 can have a plurality of cylinders 12.

The inlet valves 14 connect the combustion chamber 18 to an air supply system of the internal combustion engine 10 for supplying combustion air to the combustion chamber 18. The outlet valves 16 connect the combustion chamber 18 to an exhaust train of the internal combustion engine 10 for removing exhaust gases.

The outlet valves 16 are connected to a variable valve drive 22. The variable valve drive 22 has a separate force transmission device 24 (only one illustrated in FIG. 1) for each outlet valve 16. The variable valve drive 22 furthermore has a sliding cam system 26. The force transmission devices 24 can produce an operative connection between the sliding cam system 26 and the outlet valves 16. The force transmission devices 24 can be designed, for example, as tappets, follower levers or rocker levers. The force transmission devices 24 can each have, for example, a roller or a sliding block as cam follower. One of the force transmission devices 24 has a changing device 28 designed, for example, as a lost motion device. The changing device 28 serves for changing a transmission of a cam contour, which has been scanned or recorded by the force transmission device 24, to the outlet valve 16. The changing device 28 can be integrated at any position in the force transmission device 24. For example, the changing device 28 can be integrated on a valve side or a camshaft side of the force transmission device 24.

The piston 20 is arranged in the cylinder 12 so as to be able move to and fro in a known manner and is connected to a crank shaft 30.

One or more exhaust gas aftertreatment devices 32, e.g. a particle filter, in particular a diesel particle filter, an oxidation catalytic converter, in particular a diesel oxidation catalytic converter, and/or an SCR catalytic converter (catalytic converter for selective catalytic reduction) can be arranged in the exhaust train.

Figure 2:
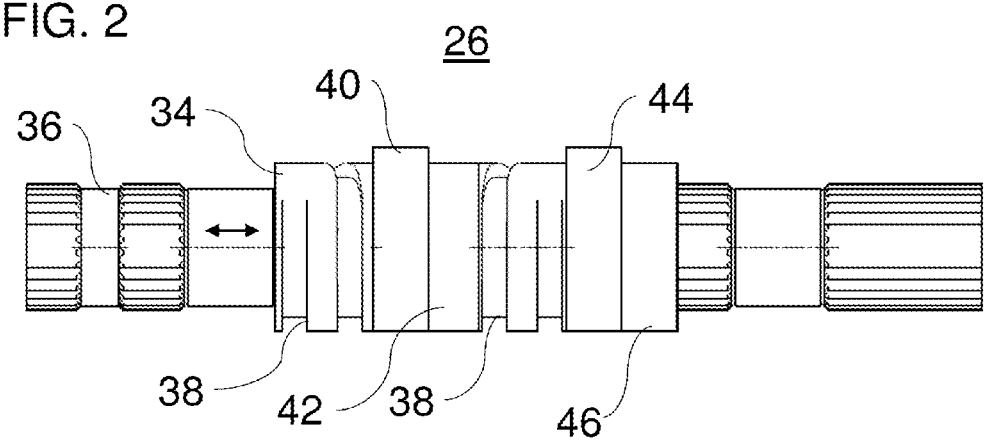
FIG. 2 shows an exemplary sliding cam system according to the present disclosure.

FIG. 2 illustrates a cut out of an exemplary sliding cam system 26.

The sliding cam system 26 has a cam carrier (sliding cam) 34. The cam carrier 34 is arranged on a (cam) shaft 36 so as to be axially displaceable and so as to rotate therewith. An axial displacement of the cam carrier 34 can take place, for example, by means of actuators which are not illustrated and can engage selectively in helical engagement tracks 38 for displacing the cam carrier 34.

The cam carrier 34 has a first cam 40, a second cam 42, a third cam 44 and a fourth cam 46. Depending on the axial position of the cam carrier 34, either the first cam 40 or the second cam 42 actuates the first outlet valve 16 via the corresponding force transmission device 24 (see FIG. 1). Similarly, the second outlet valve 16 is actuated either by the third cam 44 or by the fourth cam 46 via the corresponding force transmission device 24 (see FIG. 1). The cams 40-46 are arranged in such a manner that either the first cam 40 and the third cam 44 or the second cam 42 and the fourth cam 46 actuate the outlet valve 16 (see FIG. 1). The first cam 40 is designed like the third cam 44. The second cam 42 differs from the fourth cam 44. All of the cams 40-46 are not zero lift cams, that is to say all of the cams 40, 46 have a cam contour which would lead to a lifting actuation of the corresponding outlet valve 16.

Figure 3:
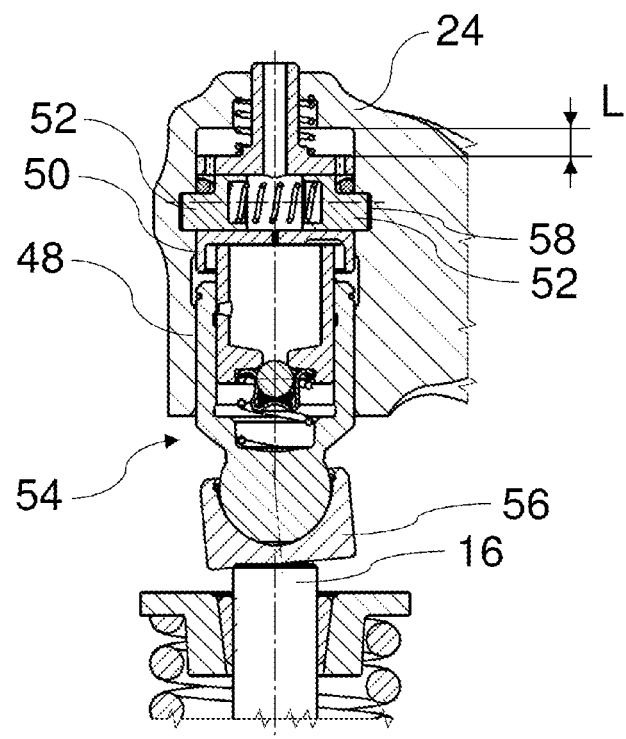
FIG. 3 shows an exemplary changing device according to the present disclosure.
Figure 4:
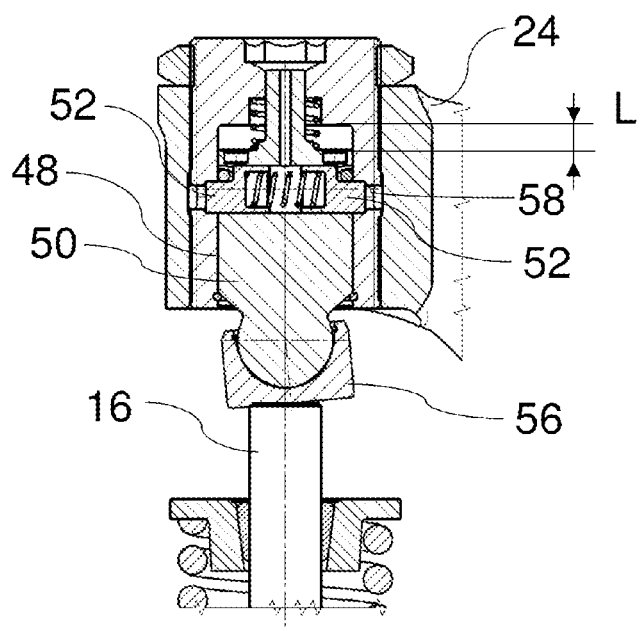
FIG. 4 shows a further exemplary changing device according to the present disclosure.

Exemplary changing devices 28 are illustrated in FIGS. 3 and 4.

With respect to FIG. 3, the changing device 28 is integrated in a receptacle 48 of the force transmission device 24 on the valve side thereof. The changing device 28 has an actuating piston 50, two blocking pistons 52, a hydraulic valve play compensating element 54 and a contact body 56.

The actuating piston 50 is arranged in the receptacle 48 so as to be displaceable axially along a longitudinal axis of the receptacle 48. In detail, the actuating piston 50 is axially displaceable between a first position, as illustrated in FIG. 3, and a second position. In the operating state of the changing device 28 that is illustrated in FIG. 3, a displacement of the actuating piston 50 from the first position into the second position is blocked by the blocking pistons 52. No change in a transmission of a cam contour scanned by the force transmission device 24 takes place. The actuating piston 50 can be prestressed axially in a direction towards the first position by an elastic element, as illustrated.

The blocking pistons 52 are mounted and guided in the actuating piston 50 so as to be displaceable in a radial direction with respect to the longitudinal axis of the receptacle 48. In the position illustrated in FIG. 3, the blocking pistons 52 are supported on a shoulder of a circumferential groove 58. This support of the blocking pistons 52 brings about blocking of the movement of the actuating piston 50. An elastic element can support the blocking pistons 52 against one another in the direction of the circumferential groove 58. The blocking pistons 52 can be acted upon hydraulically with a control fluid. The control fluid can be supplied through a supply line (not illustrated) which opens into the circumferential groove 58. A supply of the control fluids has the effect that the blocking pistons 52 move towards one another. As soon as the blocking pistons 52 are no longer supported on the shoulder of the circumferential groove 58, a movement of the actuating piston 50 from the first position into the second position is released (no longer blocked).

A transmission of a cam contour can therefore be changed by means of the changing device 28 when the blocking pistons 52 are retracted, that is to say a movement of the actuating piston 50 is released. In particular, the actuating piston 50 can carry out a lost motion L by which a cam contour to be transmitted is reduced during the transmission to the outlet valve 16.

The hydraulic valve play compensating element 54 can be designed as a conventional hydraulic valve play compensating element (what is referred to as an HVA element), and therefore the manner of operation thereof to compensate for a variable gap between a ball base and a ball receptacle of the contact body 56 is not described in more detail here.

As is shown in FIG. 4, it is, for example, also possible for the changing device 28 to be provided without a hydraulic valve play compensating element.

One advantage of the changing device 28 shown in FIGS. 3 and 4 consists in that these represent two-stage variants in which the hydraulic chamber can be structurally adapted to the lift or to the transmission ratio, as a result of which, in turn, the hydraulic volume and the volumetric flow can be kept small.

It is furthermore possible for the changing device to have a different design and/or a different arrangement as long as it makes it possible to change a transmission of a scanned cam contour to a gas exchange valve, in particular in the form of lost motion which can optionally be switched on.

The variable valve drive 22 having the sliding cam system 26 and the changing device 28 makes it possible to control the internal combustion engine 10 or the outlet valve 16 thereof in three different operating modes. Said three operating modes are described below with reference to FIGS. 1 to 7.

Figure 5:
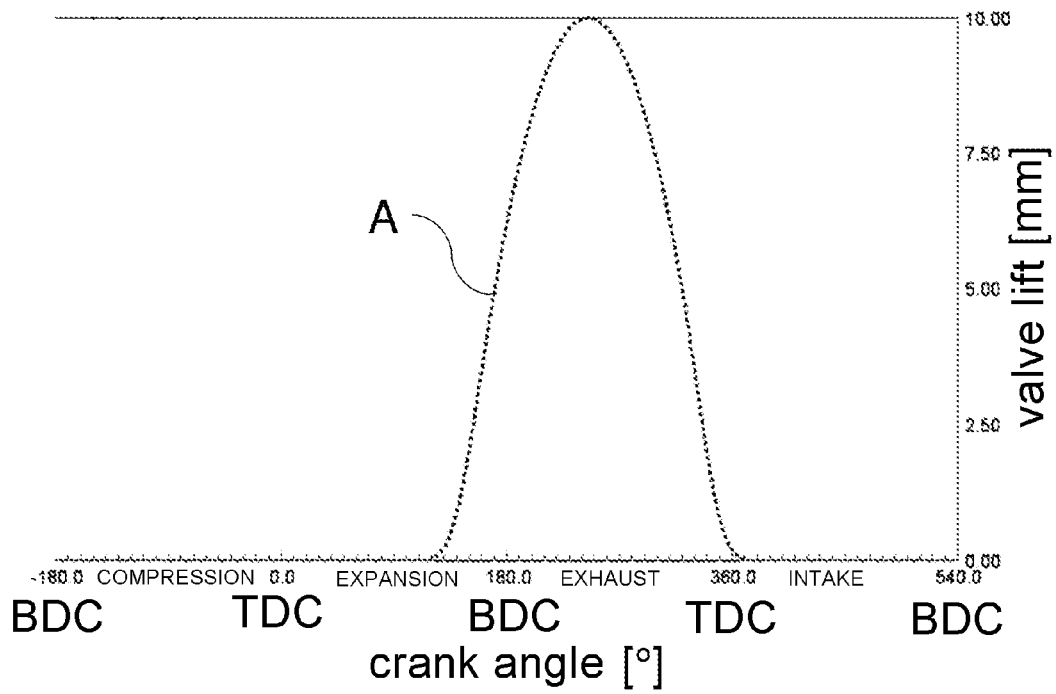
FIG. 5 shows a control diagram for outlet valves in a normal operating mode.

FIG. 5 illustrates the first operating mode in respect of a valve control curve of the outlet valves 16. Said first operating mode corresponds to a normal operating mode. In the normal operating mode, the outlet valves 16 are actuated in such a manner that they are opened during an outlet stroke (see valve control curve A). In detail, the cam contours of the first cam 40 and of the third cam 44 are designed corresponding to the valve control curve A. In the normal operating mode, the first and second outlet valves 16 are opened at the end of an expansion stroke and are closed at the end of an outlet stroke or at the beginning of an inlet stroke. In the normal operating mode, the cylinders 12 of the internal combustion engine 10 are supplied with an air/fuel mixture which is ignited in the cylinders 12.

The cylinder 12 can be operated in the normal operating mode if the cam carrier 34 has an axial position at which the first cam 40 and the third cam 444 are operatively connected to the first and second outlet valves 16. In addition, the changing device 28 cannot be activated.

Figure 6:
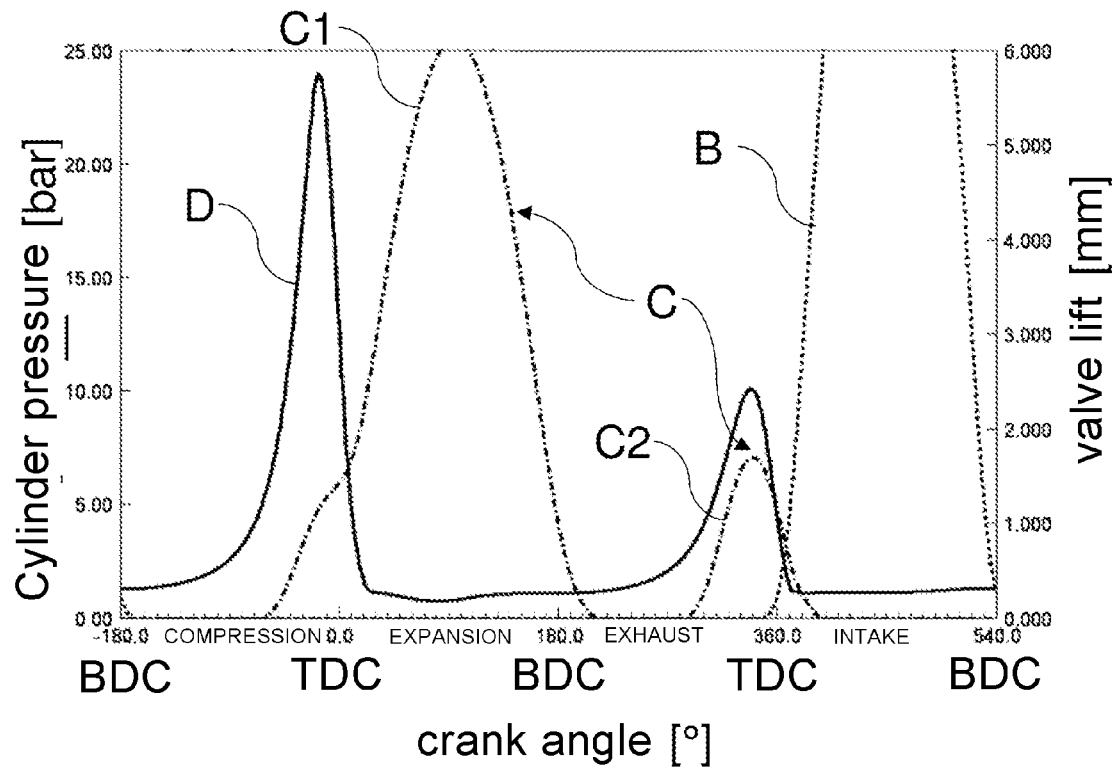
FIG. 6 shows a control diagram for outlet valves and inlet valves in an engine braking mode together with an associated cylinder pressure curve.

In FIG. 6, the second operating mode is illustrated in respect of a (combined) valve control curve of the outlet valve 16, a valve control curve of the inlet valves 14 and a cylinder pressure. The second operating mode corresponds to an engine braking mode of the internal combustion engine 10. The corresponding cylinder 12 is not fired in the engine braking mode.

The cylinder 12 can be operated in the engine braking mode if the cam carrier 34 has an axial position in which the second cam 42 and the fourth cam 44 are operatively connected to the first and second outlet valves 16. In addition, the changing device 28 may not be activated.

In the engine braking mode, the inlet valves 14 open, as in the normal operating mode, in the inlet stroke or intake stroke, as illustrated by the dotted line B. The valve control curve C, which is illustrated by a chain-dotted line, is divided between the second cam 42 and the fourth cam 46. In detail, the second cam 42 has a portion C1 of the valve control curve C. Outside the portion C1, the second cam 42 has in particular no further elevation. The fourth cam 46 has a portion C2 of the valve control curve C. Outside the portion C2, the fourth cam 46 in particular has no further elevation. The following actuation therefore arises for the outlet valves 16. The first outlet valve 16 is opened by the second cam 42 at the end of the compression stroke while the expansion stroke is opened further and finally closed at the beginning of the outlet stroke or exhaust stroke. During this time, the second outlet valve 16 remains closed in the absence of a corresponding elevation at the fourth cam 46. At the end of the outlet cycle, the fourth cam 46, according to the portion C2, opens the second outlet valve 16 and finally closes the latter again at the beginning of the intake stroke. During this time, the first outlet valve 16 remains closed for lack of a corresponding elevation at the second cam 42.

In particular, the first outlet valve 16 is opened in the compression stroke by the second cam 42 in the range between 120° crank angle before TDC and 40° crank angle before TDC, in particular at approximately 80° before TDC, and is then kept open, for example, for approximately 300° crank angle. The opening of the first outlet valve 16 by the second cam can take place in two stages, as illustrated, in order, for example, to achieve the desired compression action at the end of the compression stroke by limiting a flow cross section through the partially open first outlet valve 16 and/or to keep the loading on the variable valve drive 22 small because of the opening of the first outlet valve 16 against the pressure in the cylinder. In the expansion stroke, the first outlet valve 16 can then be opened further than in the compression stroke.

In particular, the second outlet valve 16 is opened by the fourth cam 46 in the range between 120° crank angle before TDC and 40° crank angle before TDC, in particular at approximately 80° crank angle before TDC, in the outlet stroke and is then kept open, for example, for approximately 120° crank angle.

The combined valve control curve C leads to double decompression of compressed exhaust gas in the exhaust tract, thus resulting in an engine braking action. The first decompression arises at the end of the compression stroke by means of the open first outlet valve 16 through which compressed gas is pushed out of the combustion chamber 18 into the exhaust tract. During the expansion stroke, gas is sucked out of the exhaust tract into the combustion chamber through the open first outlet valve 16. The second decompression arises at the end of the outlet stroke by means of the open second outlet valve 16 through which compressed gas is pushed out of the combustion chamber 18 to the exhaust tract. The double compression with subsequently adjoining decompression is shown by way of illustration with reference to a cylinder pressure curve D, which is illustrated as a solid line.

Figure 7:
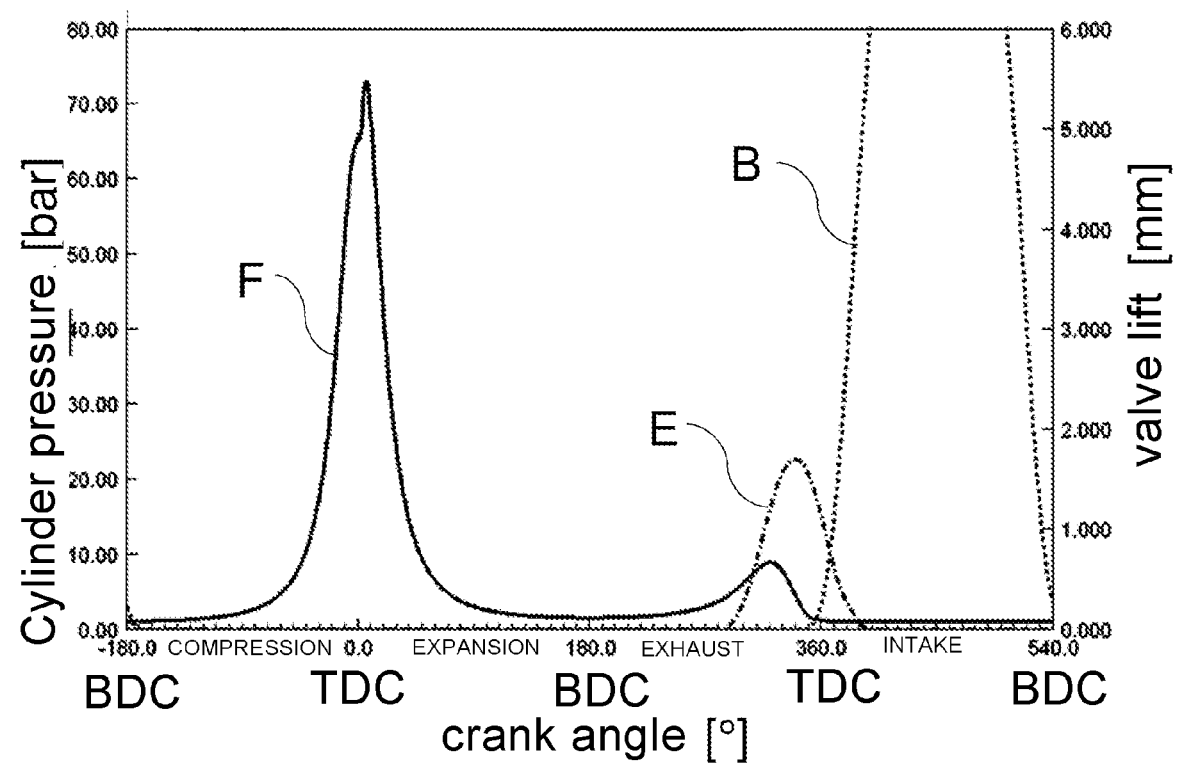
FIG. 7 shows a control diagram for an outlet valve and inlet valves in an exhaust gas temperature increasing operating mode together with an associated cylinder pressure curve.

FIG. 7 illustrates the third operating mode in respect of a valve control curve of the second outlet valve 16, a valve control curve of the inlet valves 14 and a cylinder pressure. The third operating mode corresponds to an exhaust gas temperature increasing operating mode of the cylinder 12 of the internal combustion engine 10. In the exhaust gas temperature increasing operating mode, the corresponding cylinder 12 is fired. The exhaust gas temperature increasing operating mode is carried out if it is desired to increase an exhaust gas temperature.

In certain situations, the exhaust gas temperature increasing operating mode can be desirable during the operation of the internal combustion engine 10. For example, it may be desired to regenerate a particle filter, for which purpose an exhaust gas temperature between 300° C. and 350° C. can be required. It is also possible that, during a cold start of the internal combustion engine 10, a minimum exhaust gas temperature is intended to be reached rapidly in order to ensure a desired operation of an SCR catalytic converter. In particular below a temperature of 150° C., conversion of nitrogen oxides in an SCR catalytic converter can be insufficient. If the motor vehicle is additionally operated under a weak load, for example between 600 rpm and 1000 rpm, an exhaust gas temperature level can generally be comparatively low.

The cylinder 12 can be operated in the exhaust gas temperature increasing operating mode if the cam carrier 34 has an axial position at which the second cam 42 and the fourth cam 44 are operatively connected to the first and second outlet valves 16. In addition, the changing device 28 can be activated.

Activation of the changing device 28 has the effect that the elevation of the second cam 42, that is to say the portion C1 from FIG. 6, is compensated for by the lost motion L. The second cam 42 does not open the first outlet valve 16 during an entire control cycle. As is indicated by the valve control curve E (chain-dotted line), the second outlet valve 16 is opened by the fourth cam 44 at the end of the outlet stroke and is closed again at the beginning of the intake stroke, corresponding to the portion C2 from FIG. 6. For example, a cylinder pressure profile can arise in the fired cylinder 12 in accordance with the curve F (solid line).

The temperature increase in the exhaust gas temperature increasing operating mode arises from the fact that the work of the charge exchange loop is significantly increased. This increase follows from the initial compression of the exhaust gas in the cylinder 12 in the outlet stroke and the subsequent decompression in the vicinity of the TDC. This results in a loop rotating to the left (left-handed process) in the p-V diagram (pressure p-volume V-diagram) which generates negative work and an increase in the temperature of the exhaust gas. At the same time, the additional charge exchange work has to be compensated for in the high pressure loop, which leads to an increase in the (fuel) injection quantity, which likewise leads to an increase in the exhaust gas temperature.

In an exemplary embodiment of a variable valve drive permitting normal operation, engine braking operation and exhaust gas temperature increasing operating mode is described here. It is pointed out that the possibility of controlling gas exchange valves, in particular of the same type (for example outlet valves or inlet valves) differently by means of differently configured cams of a single cam carrier can also be used for realizing other engine operating modes. A normal operating mode can therefore be realized, for example, by means of a first cam and a third cam of the cam carrier. An operating mode differing therefrom can be realized by means of the second cam and the fourth cam, with the corresponding valves being actuated differently by the second cam and the fourth cam. The combination of the cam profiles or the combining thereof then produces the differing operating mode. In addition, one or more changing devices, as, for example, disclosed herein, can optionally be used in order to compensate for a cam contour for example of the second cam and/or of the fourth cam. This can permit one or more further different operating modes, as is likewise disclosed herein by way of example in the form of the exhaust gas temperature increasing operating mode.

The disclosure is not restricted to the exemplary embodiments described above. On the contrary, a multiplicity of variants and modifications are possible which likewise make use of the inventive concept and therefore fall within the scope of protection.

LIST OF REFERENCE SIGNS

10 Internal combustion engine
12 Cylinder
14 Inlet valve
16 Outlet valve
18 Combustion chamber
20 Piston
22 Variable valve drive
24 Force transmission device 26 Sliding cam system
28 Changing device
30 Crankshaft
32 Exhaust gas aftertreatment device
34 Cam carrier
36 Shaft
38 Engagement track
40 First cam
42 Second cam
44 Third cam
46 Fourth cam
48 Receptacle
50 Actuating piston
52 Blocking piston
54 Hydraulic valve play compensating element
56 Contact body
58 Circumferential groove
A Outlet valve control curve (normal operating mode)
B Inlet valve control curve
C Outlet valve control curve (engine braking mode)
C1 First portion
C2 Second portion
D Cylinder pressure profile (engine braking mode)
E Outlet valve control curve (exhaust gas temperature increasing operating mode)
F Cylinder pressure profile (exhaust gas temperature increasing operating mode)
L Lost motion

The invention claimed is:

1. A variable valve drive for an internal combustion engine with a first gas exchange valve and a second gas exchange valve, the variable valve drive comprising:
    a sliding cam system having:
        an axially displaceable cam carrier which, for the first gas exchange valve, has a first cam and a second cam offset axially with respect to each other, and for the second gas exchange valve, has a third cam and a fourth cam offset axially with respect to each other, wherein:
        depending on an axial position of the cam carrier either the first cam is positioned for actuating the first gas exchange valve and the third cam is positioned for actuating the second gas exchange valve or the second cam is positioned for actuating the first gas exchange valve and the fourth cam is positioned for actuating the second gas exchange valve;
        the first cam, the second cam, the third cam and the fourth cam differ from a zero lift cam;
        the first cam and the third cam are identical in design; and
        the second cam and the fourth cam differ in design.

2. The variable valve drive according to claim 1, wherein the first and second gas exchange valves are outlet valves.

3. The variable valve drive according to claim 1, further comprising:
    separate force transmission devices for operative connection of the first cam and the second cam to the first gas exchange valve and for operative connection of the third cam and the fourth cam to the second gas exchange valve.

4. The variable valve drive according to claim 1, wherein:
    a first force transmission device or a second force transmission device has a changing device, which is configured to be switched on, for changing a transmission of a cam contour of an operatively connected cam of the first cam, second cam, third cam or fourth cam.

5. The variable valve drive according to claim 1, wherein:
    a first force transmission device or a second force transmission device has a lost motion device, which is configured to switched on, for at least partially compensating for a transmission of a cam contour of an operatively connected cam of the first cam, second cam, third cam or fourth cam.

6. The variable valve drive according to claim 1, wherein:
    the first cam and the third cam are configured as normal outlet valve cams; or
    the first cam and the third cam are configured to keep the first gas exchange valve and the second gas exchange valve open during an outlet stroke.

7. The variable valve drive according to claim 1, wherein the second cam is configured to open the first gas exchange valve in a compression stroke so as to bring about gas decompression.

8. The variable valve drive according to claim 1, wherein the second cam is configured to at least temporarily keep the first gas exchange valve open in an expansion stroke so as to intake gas.

9. The variable valve drive according to claim 1, wherein the fourth cam is configured to open the second gas exchange valve in an outlet stroke so as to bring about gas decompression.

10. The variable valve drive according to claim 1, wherein the second cam and the fourth cam are configured to enable in combination an engine braking mode, with a first gas decompression in the compression stroke, gas intake in the expansion stroke or a second gas decompression in the outlet stroke.

11. The variable valve drive according to claim 1, wherein:
    the fourth cam and an activated lost motion device compensate for a cam contour of the second cam so as to bring about an exhaust gas temperature increasing mode with gas decompression in the outlet stroke.

12. The variable valve drive according to claim 1, wherein the fourth cam is configured to open the second gas exchange valve in the outlet stroke:
    after a first half of the outlet stroke; or
    in the range of between 120° crank angle before TDC and 40° crank angle before TDC; or
    in the range of between 100° crank angle before TDC and 60° before TDC; or
    in the range of between 90° crank angle before TDC and 70° before TDC; or
    at 80° crank angle before TDC.

13. The variable valve drive according to claim 1, wherein the fourth cam is configured to keep the second gas exchange valve open:
    for less than 160° crank angle, 150° crank angle, 140° crank angle or 130° crank angle; or
    for more than 80° crank angle, 90° crank angle, 100° crank angle or 110° crank angle; or
    for 120° crank angle.

14. The variable valve drive according to claim 1, wherein the second cam is configured to open the first gas exchange valve in the compression stroke:
    after a first half of the compression stroke; or
    in the range of between 120° crank angle before TDC and 40° crank angle before TDC; or
    in the range of between 100° crank angle before TDC and 60° before TDC; or
    in the range of between 90° crank angle before TDC and 70° before TDC; or
    at 80° crank angle before TDC.

15. The variable valve drive according to claim 1, wherein the second cam is configured to keep the first gas exchange valve open:
- for less than 400° crank angle, 350° crank angle, 330° crank angle or 310° crank angle; or
- for more than 200° crank angle, 250° crank angle, 270° crank angle and/or 290° crank angle; or
- for 300° crank angle.

16. A motor vehicle, comprising:
an internal combustion engine;
a variable valve drive, including a first gas exchange valve and a second gas exchange valve; and
a sliding cam system having:
 an axially displaceable cam carrier which, for the first gas exchange valve, has a first cam and a second cam offset axially with respect to each other, and for the second gas exchange valve, has a third cam and a fourth cam offset axially with respect to each other, wherein:
 depending on an axial position of the cam carrier either the first cam is positioned for actuating the first gas exchange valve and the third cam is positioned for actuating the second gas exchange valve or the second cam is positioned for actuating the first gas exchange valve and the fourth cam is positioned for actuating the second gas exchange valve;
 the first cam, the second cam, the third cam and the fourth cam differ from a zero lift cam;
 the first cam and the third cam are identical in design; and
 the second cam and the fourth cam differ in design.

17. The motor vehicle of claim 16, wherein the motor vehicle is a utility vehicle.

* * * * *